United States Patent
Sasaki et al.

(10) Patent No.: US 8,451,111 B2
(45) Date of Patent: *May 28, 2013

(54) IMAGE DISPLAY APPARATUS AND METHOD FOR DISPLAYING AN IMAGE

(75) Inventors: Takashi Sasaki, Yokohama (JP); Aira Hotta, Machida (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 12/447,295

(22) PCT Filed: Feb. 27, 2009

(86) PCT No.: PCT/JP2009/000895
§ 371 (c)(1),
(2), (4) Date: Apr. 27, 2009

(87) PCT Pub. No.: WO2009/119008
PCT Pub. Date: Oct. 1, 2009

(65) Prior Publication Data
US 2011/0001639 A1    Jan. 6, 2011

(30) Foreign Application Priority Data
Mar. 28, 2008    (JP) .................. 2008-088163

(51) Int. Cl.
G09G 5/00    (2006.01)
(52) U.S. Cl.
USPC .................. 340/461; 340/980; 345/7; 345/8; 345/9; 353/13; 359/630

(58) Field of Classification Search
USPC .................. 340/461, 980; 345/7–9; 359/630, 359/633; 353/13
See application file for complete search history.

(56) References Cited

U.S. PATENT DOCUMENTS

| | | | | |
|---|---|---|---|---|
| 4,937,665 A * | 6/1990 | Schiffman | ................... | 348/115 |
| 5,206,811 A * | 4/1993 | Itoh et al. | ...................... | 701/211 |
| 6,054,937 A * | 4/2000 | Von Viebahn et al. | ........ | 340/961 |
| 7,127,350 B2 * | 10/2006 | Oikubo | ......................... | 701/211 |
| 7,830,607 B2 * | 11/2010 | Hotta et al. | ................... | 359/630 |
| 7,952,808 B2 * | 5/2011 | Hotta et al. | ................... | 359/630 |

(Continued)

FOREIGN PATENT DOCUMENTS

| | | |
|---|---|---|
| JP | 4501927 | 4/1992 |
| JP | 06175067 | 6/1994 |

(Continued)

OTHER PUBLICATIONS

International Search Report for PCT/JP2009/000895 mailed on Dec. 23, 2009.

(Continued)

*Primary Examiner* — Brent Swarthout
(74) *Attorney, Agent, or Firm* — Turocy & Watson, LLP

(57) ABSTRACT

An image display apparatus includes: an image generation unit generating a plurality of images with different figure sizes so that perceived positions of the plurality of images are sequentially located in a direction away from an actual position; a reflection member provided in front of the observer; and a projector projecting a light beam to form, the plurality of images onto a single eye of the observer through the reflection member so that the plurality of images is superimposed on a background observed through the refection member.

14 Claims, 13 Drawing Sheets

U.S. PATENT DOCUMENTS

| | | | | |
|---|---|---|---|---|
| 8,036,823 B2 * | 10/2011 | Akita et al. | | 701/429 |
| 2003/0085867 A1 * | 5/2003 | Grabert | | 345/156 |
| 2007/0103341 A1 * | 5/2007 | Kreiner et al. | | 340/988 |
| 2007/0188022 A1 * | 8/2007 | Itabashi et al. | | 307/9.1 |
| 2007/0223090 A1 | 9/2007 | Dolgoff | | |
| 2009/0279180 A1 * | 11/2009 | Amitai et al. | | 359/633 |

FOREIGN PATENT DOCUMENTS

| | | |
|---|---|---|
| JP | 08146348 | 6/1996 |
| JP | 10206790 | 8/1998 |
| JP | 10333092 | 12/1998 |
| JP | 2006-017626 | 1/2006 |
| JP | 2006195333 | 7/2006 |
| JP | 2006-284458 | 10/2006 |
| JP | 2007-272350 | 10/2007 |
| JP | 2009128565 | 6/2009 |
| JP | 2010517187 | 5/2010 |
| WO | 9734182 | 9/1997 |
| WO | 2006/004044 | 1/2006 |
| WO | 2009/066408 | 5/2009 |

OTHER PUBLICATIONS

Written Opinion of the International Searching Authority for PCT/JP2009/000895 mailed on Dec. 23, 2009.

Kim, et al. See through HMD type MF 3D display for AR, 3DTV Conference, 2007 IEEE, May 1, 2007.

Japanese Office Action for 2008-088163 issued on Jan. 24, 2011.

Examination Report Issued on Jan. 11, 2010 corresponding to U.S. Appl. No. 12/447,295, filed Apr. 27, 2009.

Examination Report Issued on Oct. 8, 2010 corresponding to U.S. Appl. No. 12/447,295, filed Apr. 27, 2009.

Chinese Office Action dated Sep. 13, 2010 corresponding to U.S. Appl. No. 12/447,295, filed Apr. 27, 2009.

Japanese Office Action dated Sep. 14, 2010 corresponding to U.S. Appl. No. 12/447,295, filed Apr. 27, 2009.

Chinese Office Action for Application No. 200980000215.0 issued on Mar. 16, 2012.

Chinese Office Action for Chinese Application No. 200980000215.0 issued on Nov. 5, 2012.

* cited by examiner

IMAGE DISPLAY APPARATUS AND METHOD FOR DISPLAYING AN IMAGE

TECHNICAL FIELD

The present invention relates to an in-vehicle image display apparatus and a method for displaying an in-vehicle image.

BACKGROUND ART

A type of in-vehicle image display apparatuses is known as head-up displays (HUDs). A HUD uses an optical system to reflect a light beam generated by a light source, such as a liquid crystal display (LCD) and a CRT display, to form an image on a reflection member such as a windshield and projects the reflected light beam to an observer (driver/operator). The observer can simultaneously view the background transmitted through the reflection member and the image presented by the light beam from the light beam generator (source), the image being superimposed on the background.

It is desirable for a HUD to match the surrounding environment observed as a background with the image by the light beam from the light beam generator (source).

To apply the image display apparatus to in-vehicle car navigation, there have been some attempts to present an image showing routing information of the vehicle or the like while the image is being matched with a background including a road. For example, one such attempts is a method which changes the form of an arrow showing the routing information at a corner of a road (refer to JP-A2006-284458). Another is a method which changes the size of an arrow located at a spatial position of the surrounding environment according to the vehicle speed (refer to JP-A 2006-17626).

In a conventional HUD, the light beam from the light beam generator is reflected by the reflection member and projected onto the eyes of an observer, to be viewed with both eyes. When the image is viewed by both eyes, the position at which the observer perceives the image to be located (perceived position) is the same as the position at which the image is presented as a virtual image (virtual image position) due to binocular disparity. It is therefore difficult to match the perceived position with distant spatial positions.

On the other hand, a monocle HUD has been proposed in which the light beam from the light beam generator is incident on and perceived by a single eye of the observer. In the monocle HUD, the perceived position of the image is not fixed to the virtual image position because there is no binocular disparity. Accordingly, the image can be located at any perceived position, and the perceived position of the image can be matched with the spatial positions of the surrounding environment.

However, in the presence of an obstacle such as a wall or a vehicle in the background, the perceived position of the image is fixed to the position of the obstacle, and it is difficult to locate the perceived position of the image farther than the obstacle. As described above, the perceived position of the image is restricted depending on the presence of the obstacle, making it difficult to view the image.

Patent Citation 1
JP-A 2006-284458 (KOKAI)
Patent Citation 2
JP-A, 2006-17626 (KOKAI)

DISCLOSURE OF INVENTION

Technical Problem

An object of the present invention is to provide an image display apparatus and a method for displaying an image, which can display to the observer a more easy-to-see image, even when an obstacle is present.

Technical Solution

An aspect of the present invention inheres in an image display apparatus including: an image generation unit configured to generate a plurality of images with different figure sizes so that perceived positions of the plurality of images are sequentially located in a direction away from an actual position; a reflection member provided in front of an observer; and a projector configured to project a light beam to form, the plurality of images onto a single eye of the observer through the reflection member so that the plurality of images is superimposed on a background observed through the refection member.

Another aspect of the present invention inheres in a method for displaying an image, including: generating a plurality of images with different figure sizes so that perceived positions of the plurality of images are sequentially located in a direction away from an actual position; and generating a light beam to form the plurality of images and reflecting the light beam on a reflection member provided in front of an observer so as to project the light beam onto a single eye of the observer so that the plurality of images are superimposed on a background observed through the refection member.

According to of the present invention, it is possible to provide an image display apparatus and a method for displaying an image, which can display to the observer a more easy-to-see image, even when an obstacle is present.

EXPLANATION OF REFERENCE

Figure 1:
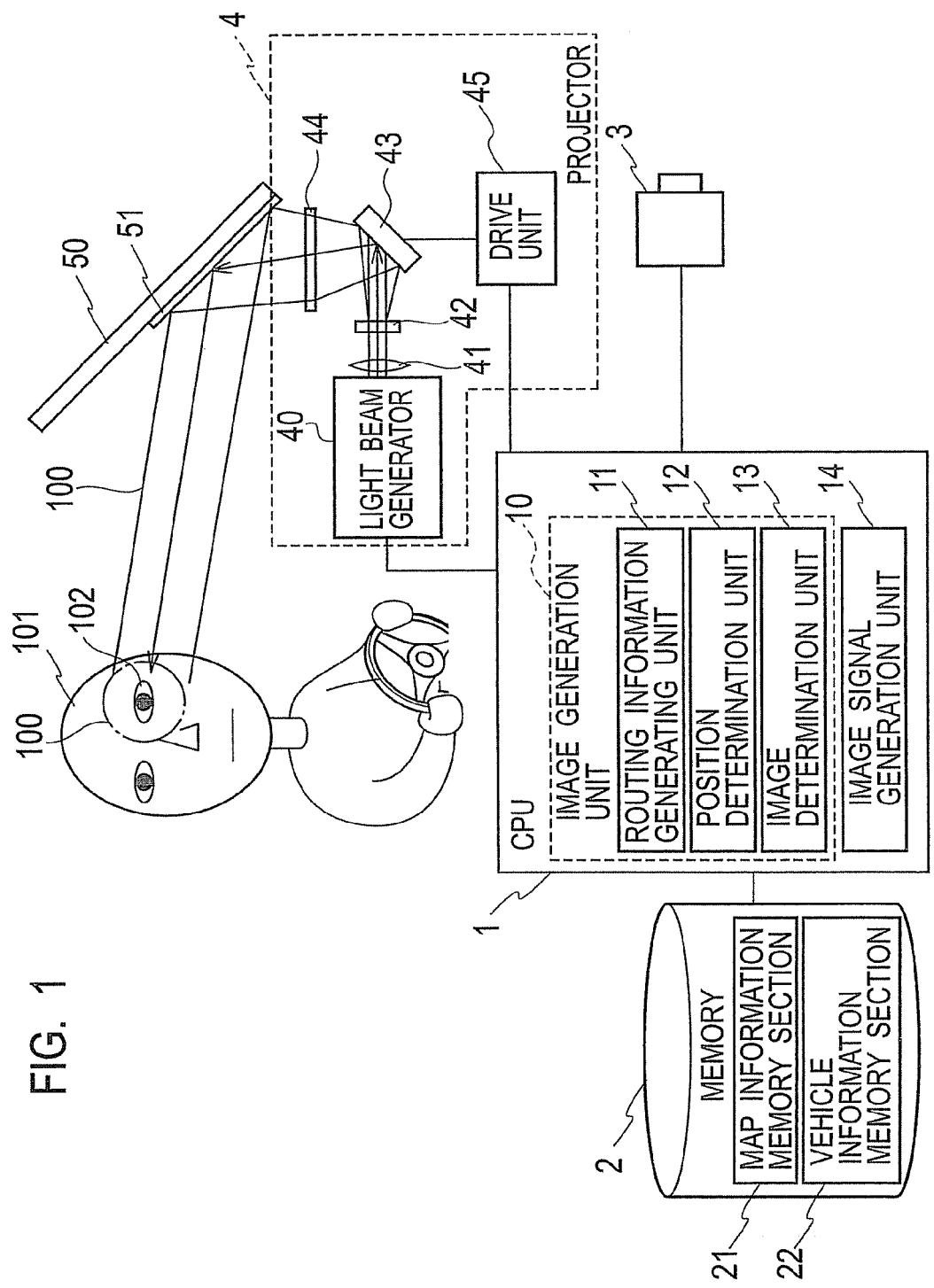
FIG. 1 is a block diagram showing an image display apparatus according to the embodiment of the present invention.

1 Central processing unit (CPU)
2 Memory
3 Vehicle sensor
4 Projector
10 Image generation unit
11 Routing information generation unit
12 Position determination unit
13 Image determination unit
14 Image signal generation unit 14
21 Map information memory section
22 Vehicle information memory section
40 Light beam generator (source)
41 Projection lens
42 Projection range controller
43 Projection position controller
44 Image magnifier
45 Drive unit
50 Reflection member (combiner)
51 highly reflection sheet

BEST MODE FOR CARRYING OUT THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of semiconductor devices, it will be appreciated that the various drawings are not drawn to scale from one figure to another nor inside a given figure, and in particular that the layer thicknesses are arbitrarily drawn for facilitating the reading of the drawings.

In the following descriptions, numerous specific details are set fourth such as specific signal values, etc. to provide a thorough understanding of the present invention. In other instances, well-known circuits have been shown in block diagram form in order not to obscure the present invention in unnecessary detail.

"Figures" described in an embodiment of the present invention include figures, symbols, and characters with codes and images with no code. In the embodiment of the present invention, the description is given using arrows used in car navigation as an example of the figures, but the figures are not limited to this, and various figures can be used.

MODE FOR THE INVENTION

As an image display apparatus according to the embodiment of the present invention, an in-vehicle monocle HUD will be described. The image display apparatus according to the embodiment of the present invention includes a central processing unit (CPU) 1, a memory 2, a vehicle sensor 3, a projector 4, and a reflection member (combiner) 50.

The projector 4 projects a light beam 100 forming a projection image onto a single eye 102 of an observer 101 through the reflection member 50. The projector 4 includes a light beam generator (source) 40, a projection lens 41, a projection range controller 42, a projection position controller 43, an image magnifier 44, and a drive unit 45.

The light beam generator 40 generates a light beam 100 to form a projection image which presents travel information such as vehicle speed, routing information to a destination, and the like to an observer (driver). Examples of the light beam generator 40 include a liquid crystal panel, a digital micro-mirror device (DMD) panel including micro-mirrors, and a light emitting diode (LED) projector. The light beam generator 40 includes a light source comprising an LED or a high pressure mercury lamp for projection of the projection image. Using LEDs as the light source can reduce the size of the apparatus and power consumption.

The projection lens 41 projects the light beam 100 which is generated by the light beam generator 40 to form the projection light. The projection range controller 42 can be a lenticular screen or a diffuser with a controlled diffusion angle. The lenticular screen can have, for example, a numeric aperture (NA) of 0.03 on an incoming side and a numeric aperture (NA) of 0.1 on an output side but is not limited thereto. The projection range controller 42 controls the range of the light beam 100 by controlling the divergence angle of the light beam 100. Preferably, the horizontal width of the light beam 100 is controlled to be not more than about 6 cm. This allows the light beam 100 to be projected onto only the single eye 102 of the observer 101 because the distance between both eyes is about 6 cm on average.

The projection position controller 43 can be a movable mirror comprising a combination of a rotatable stage and a mirror. The projection position controller 43 controls the projection position of the light beam 100 by adjusting the angle of the mobile mirror for control of the direction of the light beam 100. The projection position controller 43 is connected to the drive unit 45. The drive unit 45 can be a motor or the like. The drive unit 45 drives the projection position controller 43 based on a control signal from the CPU 1. The image magnifier 44 can be a projection lens or the like. The image magnifier 44 magnifies a projection image formed by the light beam 100 to a desired size.

The reflection member 50 reflects the light beam 100 from the image magnifier 44. The reflection member 50 can be a semi-transparent spherical concave mirror with controlled reflectivity, such as a windshield. In addition to the windshield, the reflection member 50 can be a member having combined effects of both a projection lens and a windshield, a movable concave mirror with the effects of a movable mirror and a projection lens, or the like. By adjusting the curvature of the concave mirror, the visual field of the image that the observer 101 can obtain can be changed. As shown in FIG. 1, the reflection member 50 may be provided with a highly reflection sheet 51 having a higher reflectivity than that of the reflection member 50. Since the reflection member 50 is semi-transparent, the observer 101 can see landscape ahead through the reflection member 50.

In the image display apparatus according to the embodiment of the present invention, the light beam 100 which is generated by the light beam generator 40 to form the projection image passes through the projection lens 41 to the projection range controller 42, where the projection range of the light beam 100 is controlled. Furthermore, the projection position of the light beam 100 is controlled by the projection position controller 43. The projection image formed by the light beam 100 is magnified by the image magnifier 44 to a desired size. Thereafter, the light beam 100 is reflected by the reflection member 50 and is incident onto an eye of the observer 101.

The observer 101 can see the projection image reflected by the reflection member 50 and the background transmitted through the reflection member 50 which are superimposed on each other. The CPU 1, memory 2, light beam generator 40, projector 4, and the like are incorporated in the dashboard of the vehicle.

Figure 2:
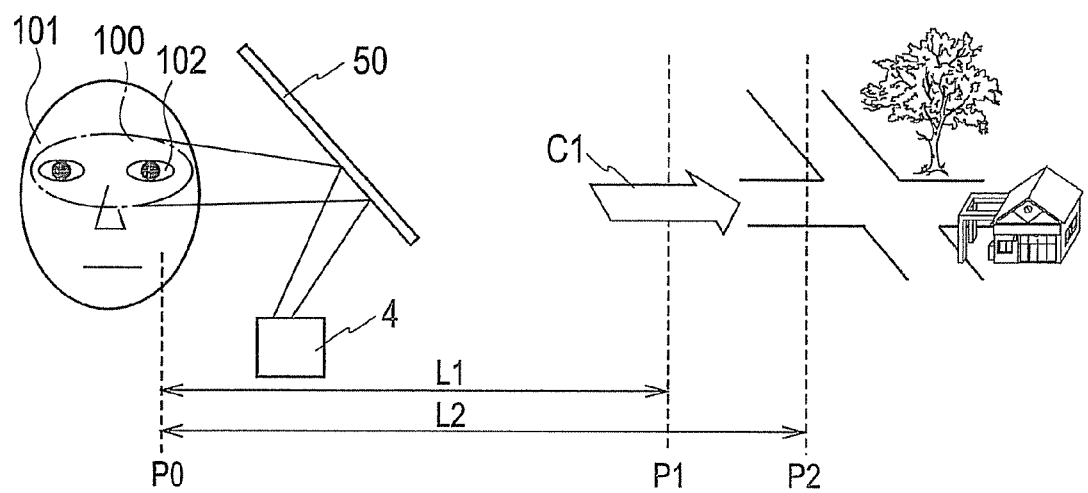
FIG. 2 is a schematic view for explaining an example of viewing an image with both eyes.

As shown in FIG. 2, an image C1 of a figure (arrow) included in the projection image formed by the light beam 100 is presented as a virtual image at a position (virtual image position) P1 a distance L1 away from a viewing position (actual position) P0. In the case where the light beam 100 from the projector 4 is incident on both eyes, the position where the observer 101 perceives the image C1 (a perceived position) is substantially coincident with the virtual image position P1 because of binocular disparity. It is therefore difficult to perceive the image C1 at a spatial position P2, which is a distance L2 away from the viewing position P0 and is farther than the virtual image position P1 from the observer 101, and match the image C1 with the background.

Figure 3:
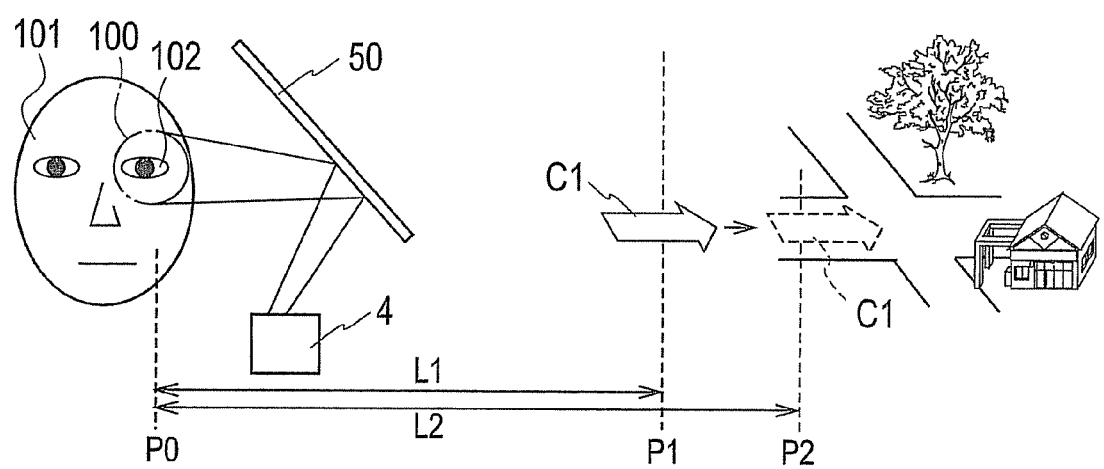
FIG. 3 is a schematic view for explaining an example of viewing an image with single eye.

On the other hand, with the image display apparatus according to the embodiment of the present invention, as shown in FIG. 3, the light beam 100 from the projector 4 is incident on a single eye 102. This eliminates the effect of binocular disparity, so that the perceived position of the image C1 is not be fixed to the virtual image position P1 and can be located at any spatial position. The image C1 can be therefore perceived at a spatial position P2 which the image C1 is desired to match.

Figure 4:
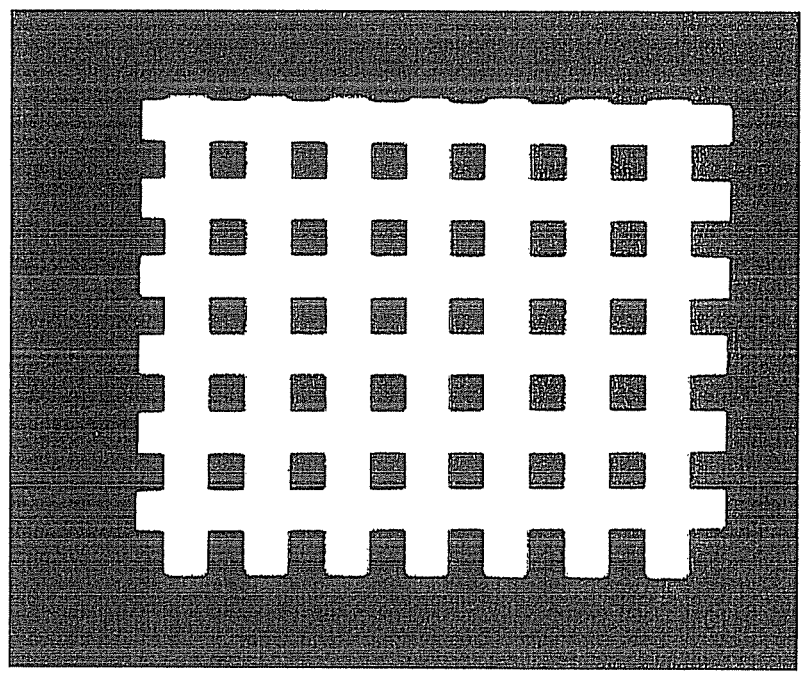
FIG. 4 is an example of an experimental image for viewing with a single eye and both eyes, respectively.
Figure 5:
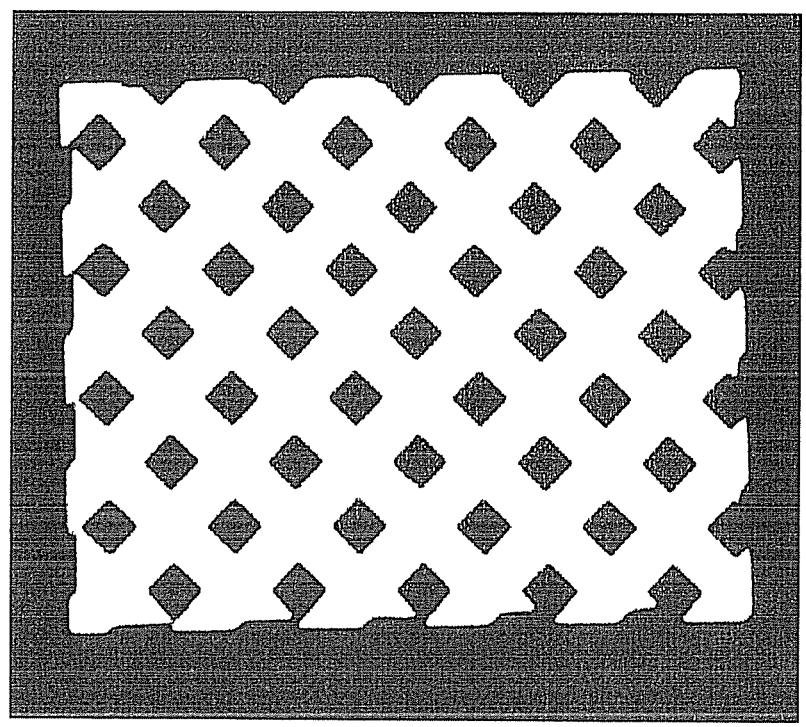
FIG. 5 is another example of an experimental image for viewing with a single eye and both eyes, respectively.

Herein, the perceived position of an image can be evaluated by the subjectivity of the observer. Experiments of comparing monocular viewing and binocular viewing were made using experimental images. The observer observed a checkered grid pattern as a normal image when viewed by a single eye and both eyes. On the other hand, the observer observed with his/her single eye and both eyes the following images: an image including a horizontal stripe pattern and a vertical stripe pattern respectively located at different positions near (2.5 m) and far (5 m) from the viewing position as shown in FIG. 4 and an image including a right-up stripe pattern and a right-down stripe pattern respectively located at different positions near (2.5 m) and far (5 m) from the viewing position as shown in FIG. 5. The observer then evaluated by his/her subjectivity whether each of the above images was perceived as a single pattern on the same plane as the normal image. The evaluations were made as follows: the subjectivity evaluation value was two (2) when the experimental image was evaluated as "very good" (the experimental image was observed to be on the same plane much better than the normal image); one (1), when evaluated as "good" (the experimental image was observed to be on the same plane better than the normal image); zero (0), when evaluated as "same" (the experimental image was the same as the normal image); minus one (−1), when evaluated as "bad" (the patterns of the experimental image were observed to be on a little different planes compared to the normal image); and minus two (−2), when evaluated as "very bad" (the patterns of the experimental image were observed to be on totally different planes compared to the normal image).

Figure 6:
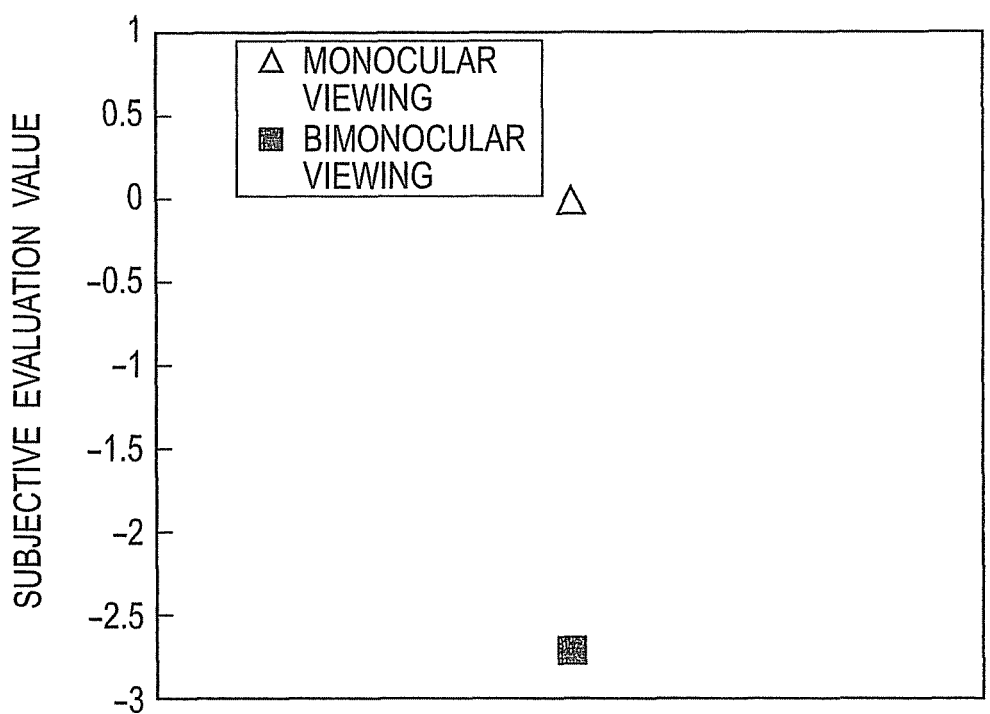
FIG. 6 is a graph showing evaluation results for viewing with a single eye and both eyes.
Figure 7:
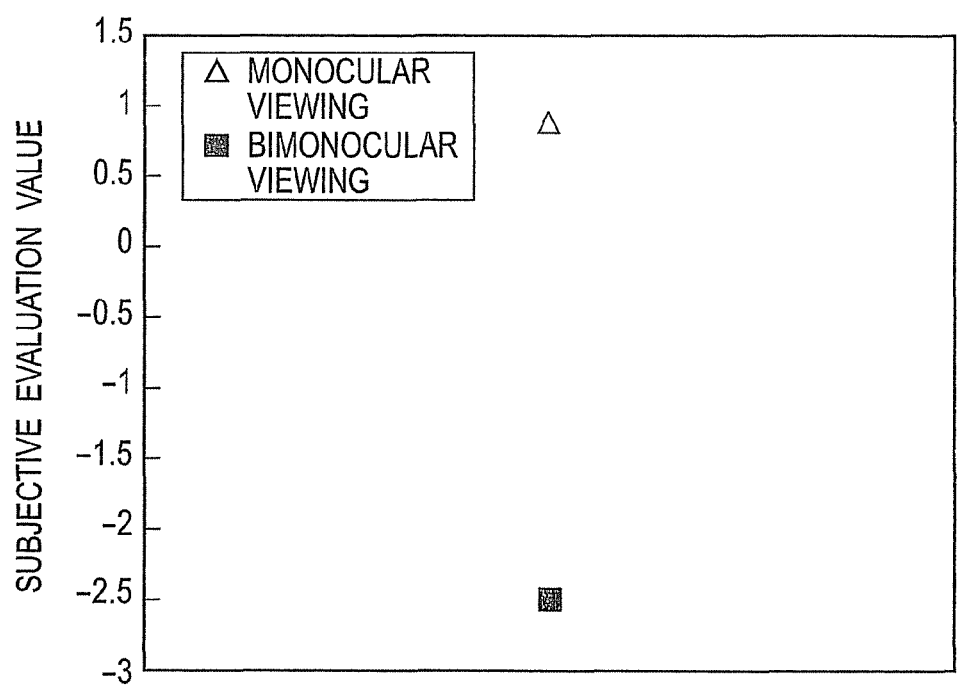
FIG. 7 is another graph showing evaluation results for viewing with a single eye and both eyes.

FIGS. 6 and 7 show evaluation results of the experimental images shown in FIGS. 4 and 5, respectively. FIGS. 6 and 7 reveal that the patterns were perceived on different planes with binocular viewing but were perceived as a single image on the same plane with monocle viewing.

Figure 8:
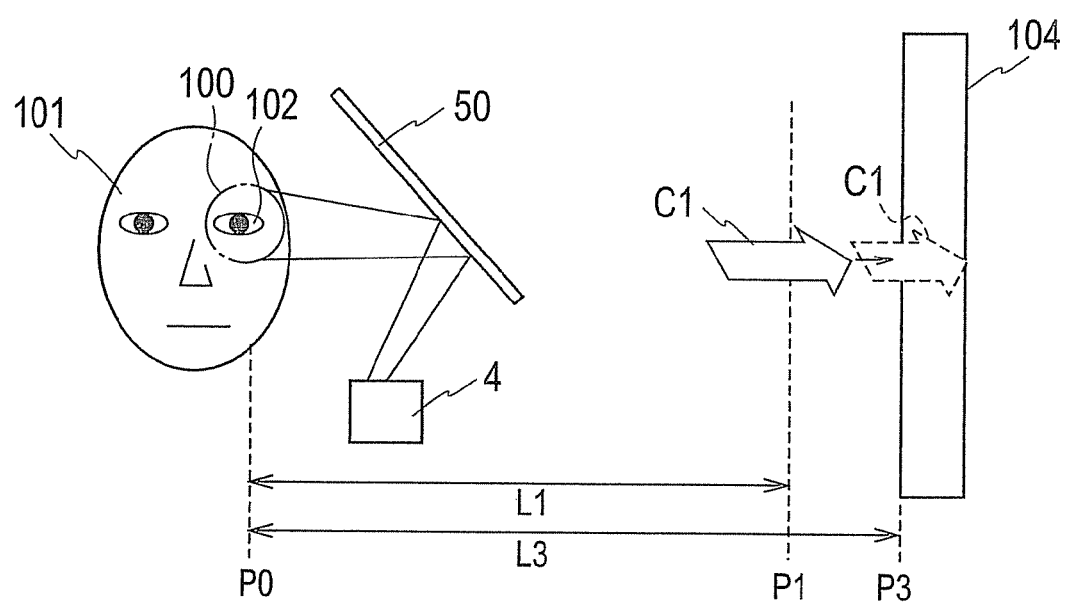
FIG. 8 is a schematic view showing an example of presenting an obstacle when a single eye views an image.

Herein, as shown in FIG. 8, in the case where an obstacle 104 such as a wall or a vehicle is located at a position P3 a distance L3 away from the viewing point on the background, the perceived position of the image C1 is restricted by the obstacle 104, and it is difficult to perceive the image C1 to be at a position farther than the position P3 of the obstacle 104 from the observer.

A vehicle sensor 3 shown in FIG. 1 is placed in the front of the vehicle or the like and acquires vehicle information including the speed and travel direction of the vehicle, and the presence of an obstacle in front. The vehicle sensor 3 can be a camera, a radar system, or the like. The CPU 1 logically includes: an image generation unit 10; and an image signal generation unit 14 as modules (logical circuits) as hardware resources. The image generation unit 10 generates a plurality of images of such different figure sizes that the perceived positions of the images are different in a direction away from the position of the observer. The image signal generation unit 14 generates an image signal corresponding to an output image generated by image generation unit 10.

The image generation unit 10 includes a routing information generation unit 11, a position determination unit 12, and an image determination unit 13. The routing information generation unit 11 reads out map information from a map information memory 21 and recognizes a final destination to generate routing information corresponding to the final destination.

The position determination unit 12 recognizes a current location from the routing information generated by the routing information generation unit 11 and determines, based on the routing information and current location, a temporary destination which is to be directed to the observer 101 at present. The position determination unit 12 determines, based on the temporary destination, that an ending position (perceived position) P13 where an end image out of the plurality of images is located is a position a distance L13 away from the viewing position P10 in the depth direction as shown in FIG. 9.

The position determination unit 12 reads out the vehicle information from the vehicle information memory section 22 and extracts the speed and travel direction of the vehicle. The position determination unit 12 then sets, based on the speed and travel direction of the vehicle and the current location, a starting position (perceived position) P11 where a start image out of the plurality of images is located to a position a distance L11 away from the viewing point P10 in the depth direction.

The position determination unit 12 sets a pathway position P12 where an image, of the plurality of images, connects the end and start images to a position a distance L12 away from the viewing point P10 in the depth direction between the start and end positions P11 and P13.

Figure 9:
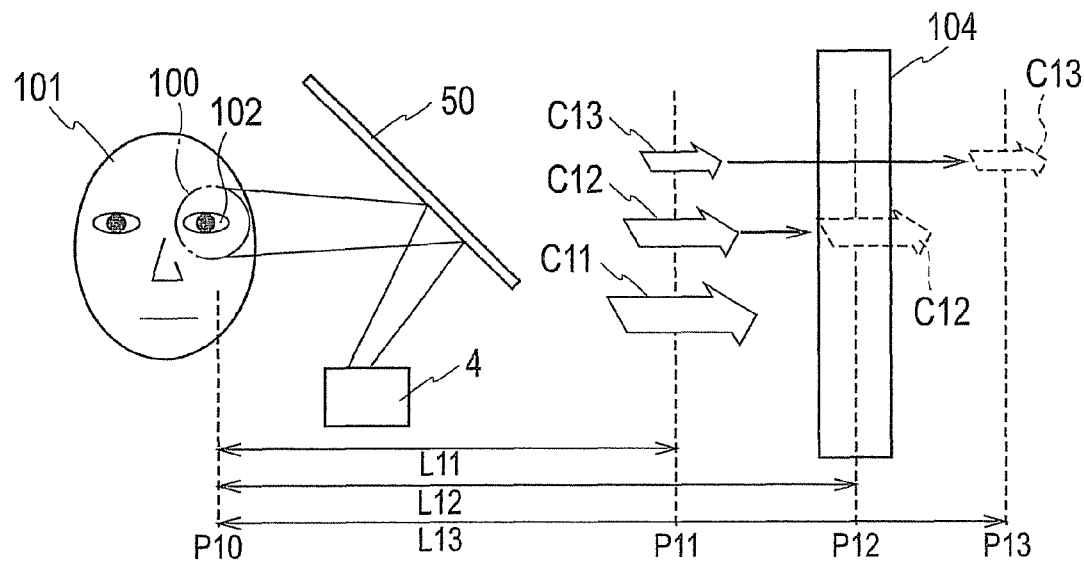
FIG. 9 is a schematic view for explaining a method for displaying an image according to the embodiment.

The image determination unit 13, as shown in FIG. 9, determines images different in figure size sequentially smaller from the starting (start) position P11 to the ending (end) position P13, which are determined by the position determination unit 12, for example, images C11, C12, and C13 located at the starting position, pathway position, and ending position P11, P12, and P13 respectively. Furthermore, the image determination unit 13 generates an output image including the determined images C11, C12, and C13.

The image signal generation unit 14 outputs an image signal based on the output image generated by the image generation unit 10. The light beam generator 40 generates the light beam 100 to form a projection image based on the image signal. The generated light beam 100 is projected onto a single eye 102 of the observer 101 by the projector 4.

Figure 10:
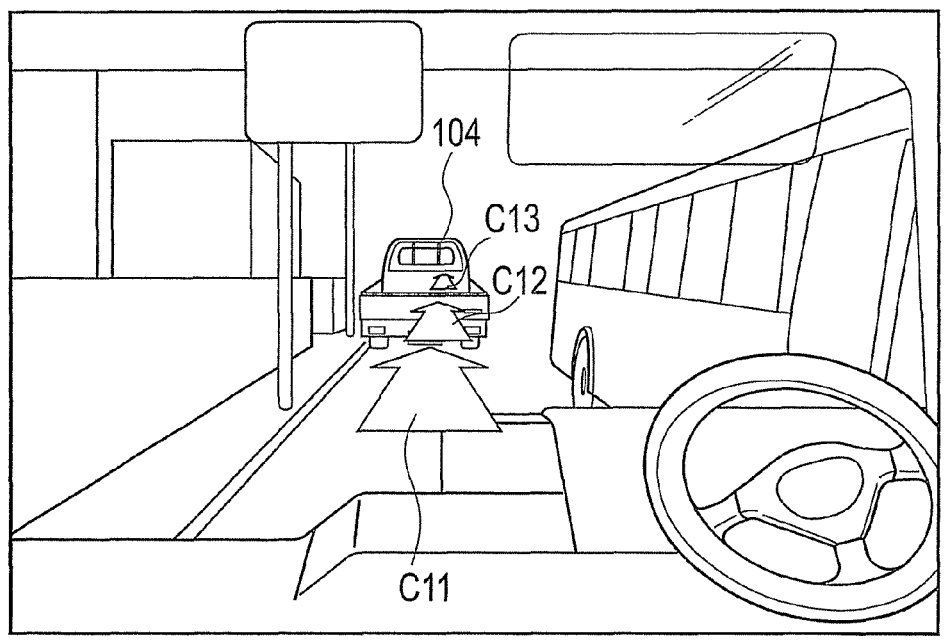
FIG. 10 is an image showing actual displaying of the image display apparatus according to the embodiment.

A shown in FIG. 9, when the images C11, C12, and C13 are designed to have different sizes in descending order from the starting (start) position P11 to the ending (end) position P13, the observer 101 perceives the images C12 and C13, which are smaller than the image C11, to be located farther than the image C11. Specifically, although the plurality of images C11, C12, and C13 are fixed at the starting position (virtual image position) P11, the perceived positions P12 and P13 of the small images C12 and C13 individually recede from the starting position P11 while the large image C1 is perceived to be at the starting position P11. By presenting the images C11, C12, and C13 which are generated with figure sizes which are sequentially different in such a described manner, it is possible for the observer to perceive the images C11, C12, and C13 to sequentially move in the depth direction without being restricted by the presence of the obstacle 104. FIG. 10 shows an example in which the images C11, C12, and C13 are presented using the image display apparatus according to the embodiment of the present invention in the presence of the obstacle 104 (vehicle) in front.

The memory 2 shown in FIG. 1 includes: a map information memory section 21 for storing the map information in advance; and the vehicle information memory section 22 for storing the vehicle information continuously acquired by the vehicle sensor 3. A semiconductor memory, a magnetic disk, an optical disk, a magneto-optical disk, a magnetic tape or the like may be used for the memory 2. For the semiconductor memory, a read-only memory (ROM) and random-access memory (RAM) may be used. The ROM stores a program executed by the CPU 1 (the details of the program are described later). The RAM serves as a temporary data memory for storing data used in executing a program by the CPU 1, and used as a working domain.

Figure 11:
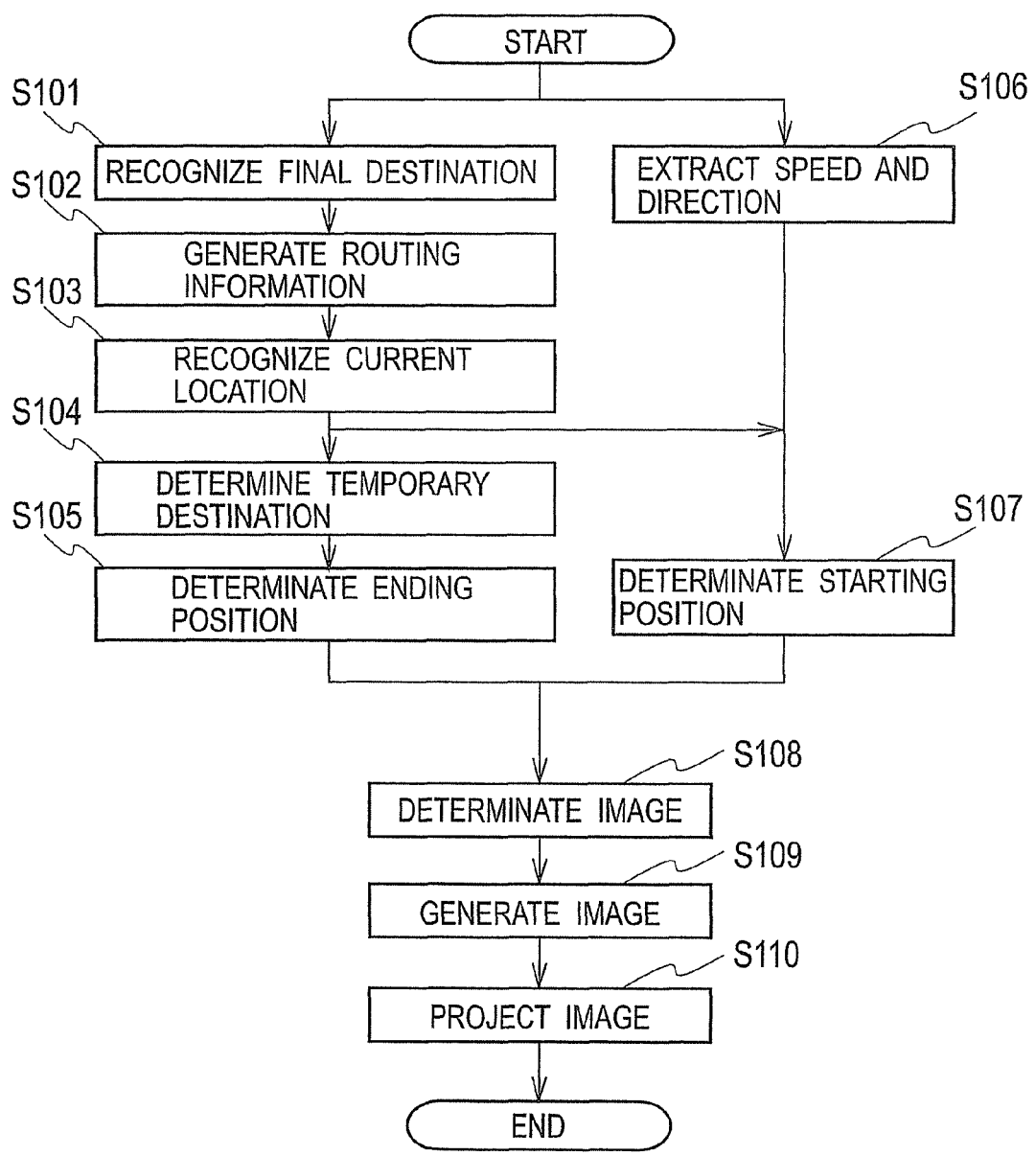
FIG. 11 is a flowchart for explaining method for displaying an image according to the embodiment.

Next, a description is given of an example of an image display method according to the embodiment of the present invention with reference to a flowchart of FIG. 11.

In step S101, the routing information generation unit 11 reads out the map information from the map information memory section 21 and recognizes the final destination. In step S102, the routing information generation unit 11 generates the routing information corresponding to the final destination.

In step S103, the position determination unit 12 recognizes the current location from the routing information generated by the routing information generation unit 11. In step S104, the position determination unit 12 then determines from the routing information and current location the temporary destination which is to be directed to the observer 101 at present.

In step S105, the position determination unit 12 determines from the temporary destination the ending position P13, at which the ending image out of the plurality of images is to be located, as shown in FIG. 9.

In step S106, the position determination unit 12 reads out the vehicle information from the vehicle information memory section 22 and extracts the speed and travel direction of the vehicle. In step S107, the position determination unit 12 then determines from the speed and travel direction of the vehicle and the current location the starting position P11, at which the starting image is to be located. The position determination unit 12 then determines the pathway position P12, at which an image is to be located, between the starting and ending positions P11 and P13.

In step S108, the image determination unit 13 determines the image C11 at the starting position P11, the image C12 at the pathway position P12, and the image C13 at the ending position P13 which are generated sequentially with different figure sizes from the starting position P11 to the ending position P13 determined by the position determination unit 12 as shown in FIG. 9. In step S109, the image determination unit 13 generates the output image including the determined images C11, C12, and C13.

In step S110, the image signal generation unit 14 outputs an image signal based on the output image generated by the image generation unit 10. The light beam generator 40 generates the light beam 100 forming the projection image based on the image signal. The generated light beam 100 is projected by the projector 4 onto the single eye 102 of the observer 101.

According to the image display apparatus and image display method of the embodiment of the present invention, by presenting the images C11, C12, and C13 generated sequentially with different figure sizes, even in the presence of the obstacle 104 in the background observed through the reflection member 50 the perceived positions P11, P12, and P13 of the images C11, C12, and C13 can be located beyond the obstacle 104 by the human visual field. This makes it possible to present to the observer a more easy-to-see image with a feeling of depth.

The series of steps shown in FIG. 11 can be executed by controlling the image display apparatus shown in FIG. 1 with a program having an algorism equivalent to that of FIG. 11. The steps are: the step of generating the images C11, C12, and C13 with figure size made sequentially different so that the perceived positions P11, P12, and P13 of the plurality of images C11, C12, and C13 by the observer 101 are sequentially located in a direction away from the position P10 of the observer 101; and the step of generating a light beam forming the output image and reflecting the light beam 100 on the reflection member 50 for projection thereof onto a single eye of the observer 101 so that the image is superimposed on the background observed through the refection member 50 provided in front of the observer 101.

The program may be stored in the memory 2 of the image display apparatus according to the embodiment of the present invention. The program can be stored in a computer-readable storage medium. The procedures of the method according to the embodiment of the present invention can be performed by reading the program from the computer-readable storage medium to the data memory 2.

Here, the "computer-readable storage medium" means any media and the like that can store a program include, e.g., external memory units, semiconductor memories, magnetic disks, optical disks, magneto-optical disks, magnetic tape, and the like for a computer. To be more specific, the "computer-readable storage media" include flexible disks, CD-ROMs, MO disks, cassette tape, open reel tape, and the like. For example, the main body of the image display apparatus can be configured to incorporate a flexible disk drive and an optical disk drive, or to be externally connected thereto. A flexible disk is inserted into the flexible disk drive from a slot, a CD-ROM is inserted into the optical disk drive from a slot, and then a given readout operation is executed, whereby programs stored in these storage media can be installed on the memory 2. In addition, by connecting given drives to the image display apparatus, it is also possible to use, for example, a ROM as a memory unit employed for a game pack or the like, and cassette tape as magnetic tape. Furthermore, it is possible to store a program in another program storage device via an information processing network, such as the Internet.

First Modification

In the embodiment of the present invention, the description is given of an example in which images with sequentially different sizes are simultaneously presented. As a first modification of the embodiment of the present invention, an example in which images with sequentially different sizes are sequentially presented in time series will be described.

Figure 12:
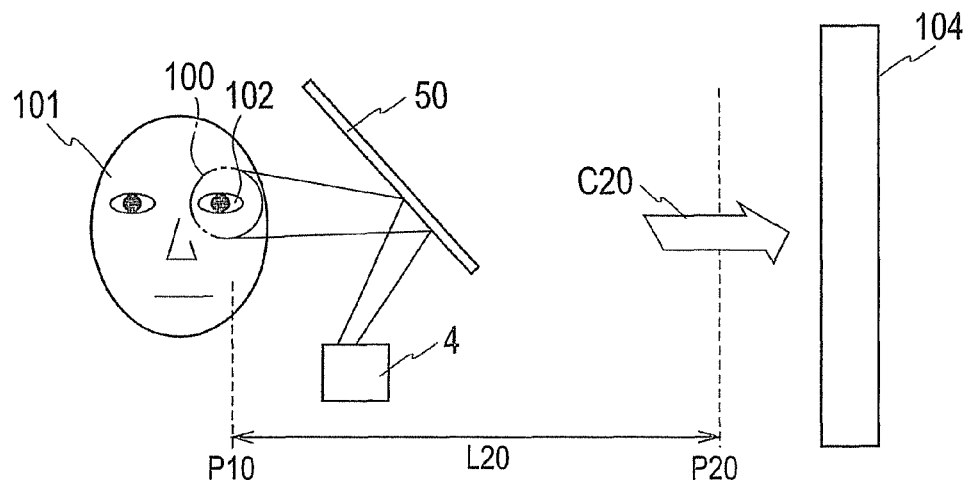
FIG. 12 is a schematic view for explaining examples of an image display method according to the first modification of the present invention.

The image generation unit 10 generates a first image C20 at a starting position P20 a distance L20 from the viewing position P10 as shown in FIG. 12. For example, the image C20 is perceived to be at a virtual image position P20.

Figure 13:
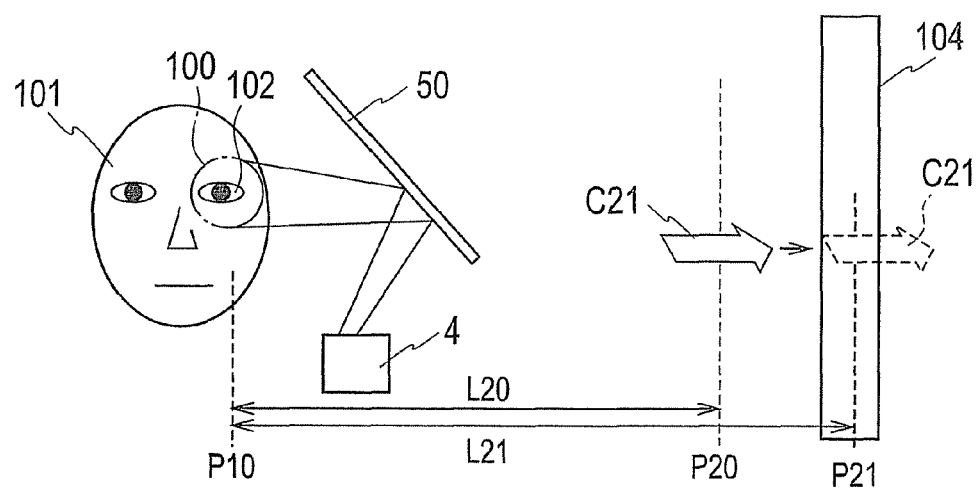
FIG. 13 is another schematic view for explaining the example of the image display method according to the first modification of the present invention.

As shown in FIG. 13, the image generation unit 10 subsequently presents a second image C21, which is smaller than the first image C20, at a pathway position P21 a distance L21 away from the viewing position 10 between the starting and ending positions P20 and P22. The virtual image position P20 of the second image C21 is coincident with the virtual image position P20 of the first image C20. However, by presenting the second image C21 sequentially after the first image C20 is presented, a perceived position P21 of the second image C21 can be located (displaced) farther than the perceived position P20 of the first image C20.

Figure 14:
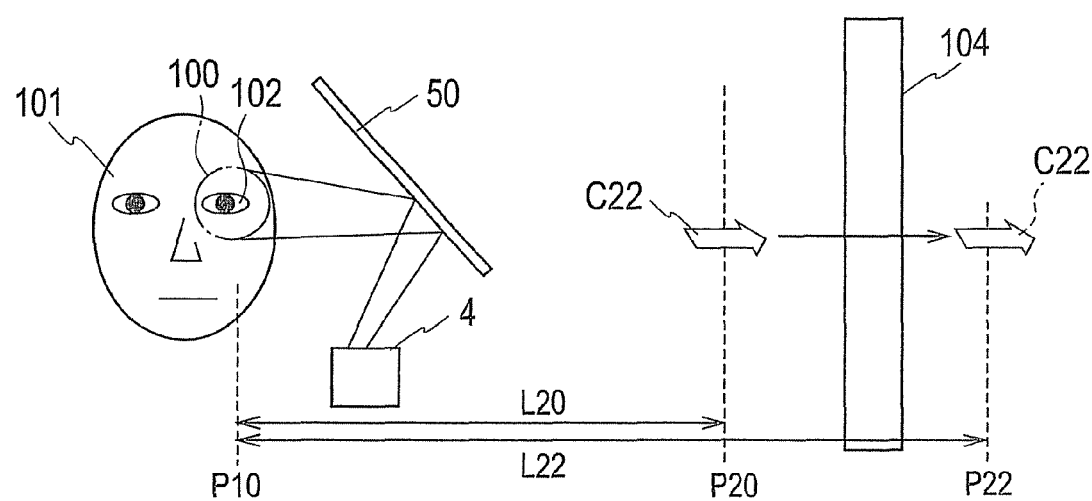
FIG. 14 is another schematic view for explaining the example of the image display method according to the first modification.

As shown in FIG. 14, the image generation unit 10 then presents a third image C22, which is smaller than the second image C21, at an ending position P22 a distance L22 away from the viewing position P10. The virtual image position P20 of the second image C22 is coincident with the virtual image positions P20 of the first and second images C20 and C21. However, by presenting the third image C22 sequentially after the second image C21 is presented, the perceived position P22 of the third image C22 can be located (displaced) farther than the perceived position P21 of the second image C21.

According to the first modification of the embodiment of the present invention, the plurality of images C20, C21, and C22 generated with different figure sizes are chronologically presented. It is therefore possible to arrange the perceived positions P20, P21, and P22 of the images C20, C21, and C22 without any restrictions by the obstacle 104. The vertical positions of the images C20, C21, and C22 may be sequentially shifted or may be unchanged.

Second Modification

As a second modification of the embodiment of the present invention, a description is given of an example in which the image generation unit 10 generates images with different figure sizes and shapes (outlines).

Figure 15:
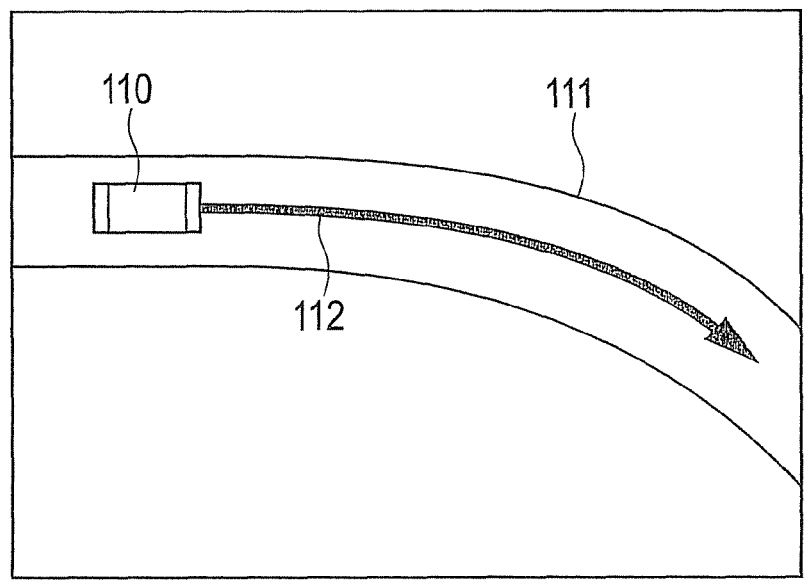
FIG. 15 is a schematic view showing an example of traveling a vehicle according to the second modification.
Figure 16:
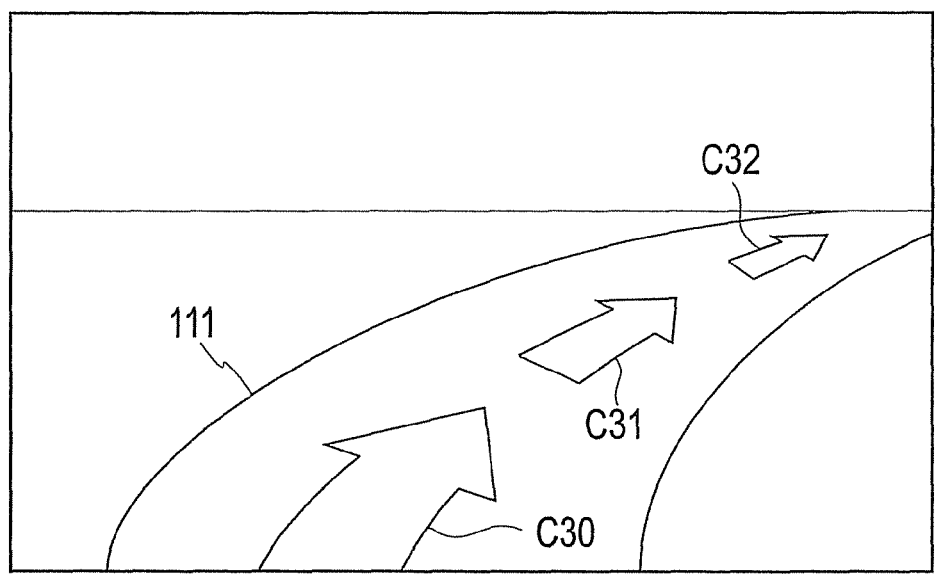
FIG. 16 is a schematic view showing an example of a display by the image display apparatus according to the second modification.

FIG. 15 shows an example of a vehicle 110 traveling a route 112 along road 111. In this case, the image generation unit 10 generates images C30, C31, and C32 having sizes and shapes of figures (arrows) sequentially different along a gentle curve of the road 111 as shown in FIG. 16. This makes it possible to provide the observer 101 with a stable routing guide along the road 111. Moreover, even in the presence of an obstacle such as another vehicle in front, the routing guide can be performed independently of the obstacle.

Figure 17:
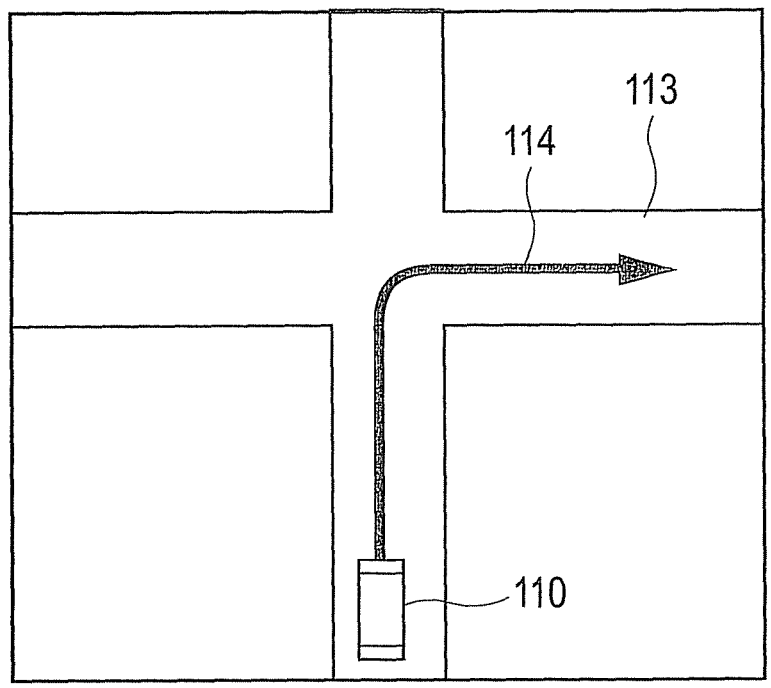
FIG. 17 is a schematic view showing another example of traveling a vehicle according to the second modification.
Figure 18:
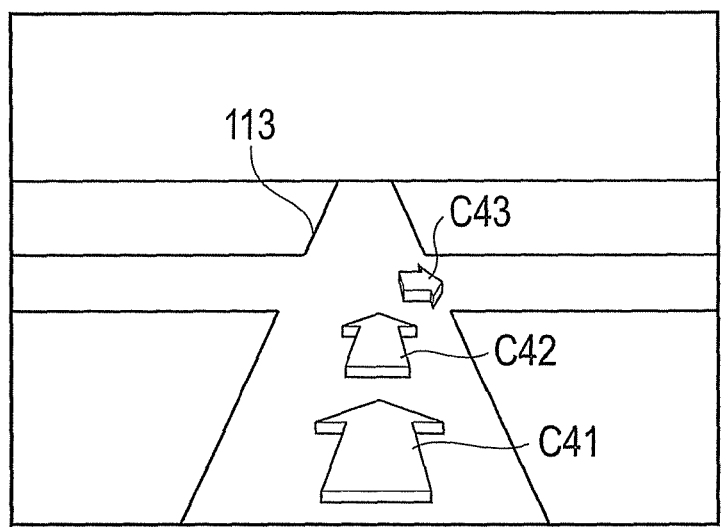
FIG. 18 is a schematic view showing another example of a display by the image display apparatus according to the second modification.

FIG. 17 shows an example in which a pathway 114 to the destination of the vehicle 110 does not agreed with the travel direction. When there is no obstacle in an open view, the route of the vehicle 110 to the destination can be indicated by a straight line, but is not desirable. Accordingly, the image generation unit 10 generates, based on the routing information obtained from the map and vehicle information and the travel direction of the vehicle 110, images C41, C42, and C43 with different sizes and shapes of the figures (arrows) along the road 113. This provides a routing guide which can be easily recognized by the observer 101.

Various modifications will become possible for those skilled in the art after receiving the teachings of the present disclosure without departing from the scope thereof.

In the above description of the embodiment of the present invention, the image display apparatus is an in-vehicle monocle HUD. The applications of the image display apparatus is not limited to vehicles, and it is obvious that the image display apparatus can be applied to ships, airplanes, machine tools, construction machines, industrial machines, and the like.

The embodiment of the present invention is described with the images C11, C12, and C13 as an example, but the number of images presented is not particularly limited. It is only necessary to present two images at the starting and ending positions, and there may be four or more images presented between the starting and ending positions.

The image generation unit 10 may determine the presence of the obstacle 104 and the position and size of the obstacle 104 and generate the output image including a plurality of images according to the condition of the obstacle 104.

INDUSTRIAL APPLICABILITY

The present invention can be used for an in-vehicle image display apparatus and a method for displaying an in-vehicle such as image head-up displays.

The invention claimed is:

1. An image display apparatus comprising:
   an image generation unit configured to generate a plurality of images to indicate a route to an observer; and
   a projector configured to project a light beam to form the plurality of images onto a first eye of the observer by reflecting at a reflection member so that the plurality of images is superimposed on positions along the route in a background observed through the reflection member, the projector configured not to project the light beam onto a second eye of the observer different from the first eye to eliminate an effect of binocular disparity, an image of the background being incident on the first and second eyes,
   the projector including a projection range controller configured to control a divergence angle of the light beam to project the light beam onto the first eye of the observer and not to project the light beam onto the second eye, wherein
   the projector projects the light beam to form the plurality of images at a single position,
   the image generation unit generates the plurality of images to be arranged along the route when observed by the first eye of the observer and changes at least one of a shape and a direction of the plurality of images along the route, and
   the image generation unit generates the plurality of images with different figure sizes being sequentially decreased in a direction away from a position of the observer so that perceived positions of the plurality of images are sequentially located in the direction away from the position of the observer along the route when the plurality of images are observed by the first eye of the observer.

2. The apparatus of claim 1, wherein the image generation unit generates the plurality of images so as to present the plurality of images simultaneously.

3. The apparatus of claim 1, wherein the image generation unit generates the plurality of images so as to present the plurality of images chronologically and sequentially.

4. The apparatus of claim 1, wherein the image generation unit comprises:

a routing information generation unit configured to generate routing information for the route from map information;

a position determination unit configured to determine a starting position and an ending position away from an actual position based on the routing information; and an image determination unit configured to determine the plurality of images with different figure sizes from the starting point to ending point.

5. A method for displaying an image, comprising:

generating a plurality of images to indicate a route to an observer;

projecting a light beam to form the plurality of images onto a first eye of the observer by reflecting at a reflection member so that the plurality of images are superimposed on positions along the route in a background observed through the refection member, and not projecting the light beam onto a second eye of the observer different from the first eye to eliminate an effect of binocular disparity, an image of the background being incident on the first and second eyes; and controlling a divergence angle of the light beam to project the light beam onto the first eye of the observer and not to project the light beam onto the second eye, wherein the projecting the light beam includes forming the plurality of images at a single position, the generating the plurality of images includes arranging the plurality of images along the route when observed by the first eye of the observer and changes at least one of a shape and a direction of the plurality of images along the route, and the generating the plurality of images includes decreasing figure sizes of the plurality of images so as to be sequentially decreased in a direction away from a position of the observer so that perceived positions of the plurality of images are sequentially located in the direction away from the position of the observer along the route when the plurality of images are observed by the first eye of the observer.

6. The method of claim 5, wherein generating the plurality of images comprises:

generating routing information for the route from map information;

determining a starting position and an ending position away from an actual position based on the routing information; and determining the plurality of images with different figure sizes from the starting point toward to ending point.

7. The apparatus of claim 1, wherein the reflection member comprises a windshield.

8. The apparatus of claim 1, wherein the reflection member includes a windshield, and a highly reflective sheet provided on the windshield, the highly reflective sheet having a higher reflectivity than a reflectivity of the windshield.

9. A vehicle display apparatus comprising:

a vehicle sensor configured to acquire an information of a vehicle; and an image display apparatus configured to present an image including the information on a route to an observer in the vehicle, the image display apparatus having:

an image generation unit configured to generate a plurality of images to indicate the route to the observer, and a projector configured to project a light beam to form, the plurality of images onto a first eye of the observer by reflecting at a reflection member so that the plurality of images is superimposed on positions along the route in a background observed through the refection member, the projector configured not to project the light beam onto a second eye of the observer different from the first eye to eliminate an effect of binocular disparity, an image of the background being incident on the first and second eyes;

the projector including a projection range controller configured to control a divergence angle of the light beam to project the light beam onto the first eye of the observer and not to project the light beam onto the second eye, wherein the projector projects the light beam to form the plurality of images at a single position, the image generation unit generates the plurality of images to be arranged along the route when observed by the first eye of the observer and changes at least one of a shape and a direction of the plurality of images along the route, and the image generation unit generates the plurality of images with different figure sizes being sequentially decreased in a direction away from a position of the observer so that perceived positions of the plurality of images are sequentially located in the direction away from the position of the observer along the route when the plurality of images are observed by the first eye of the observer.

10. The apparatus of claim 9, wherein the image generation unit generates the plurality of images so as to present the plurality of images simultaneously.

11. The apparatus of claim 9, wherein the image generation unit generates the plurality of images so as to present the plurality of images chronologically and sequentially.

12. The apparatus of claim 9, wherein the image generation unit comprises:

a routing information generation unit configured to generate routing information for the route from map information;

a position determination unit configured to determine a starting position and an ending position away from an actual position based on the routing information; and an image determination unit configured to determine the plurality of images with different figure sizes from the starting point to ending point.

13. The apparatus of claim 9, wherein the reflection member comprises a windshield.

14. The apparatus of claim 9, wherein the reflection member includes a windshield, and a highly reflective sheet provided on the windshield, the highly reflective sheet having a higher reflectivity than a reflectivity of the windshield.

* * * * *